Patented July 31, 1928.

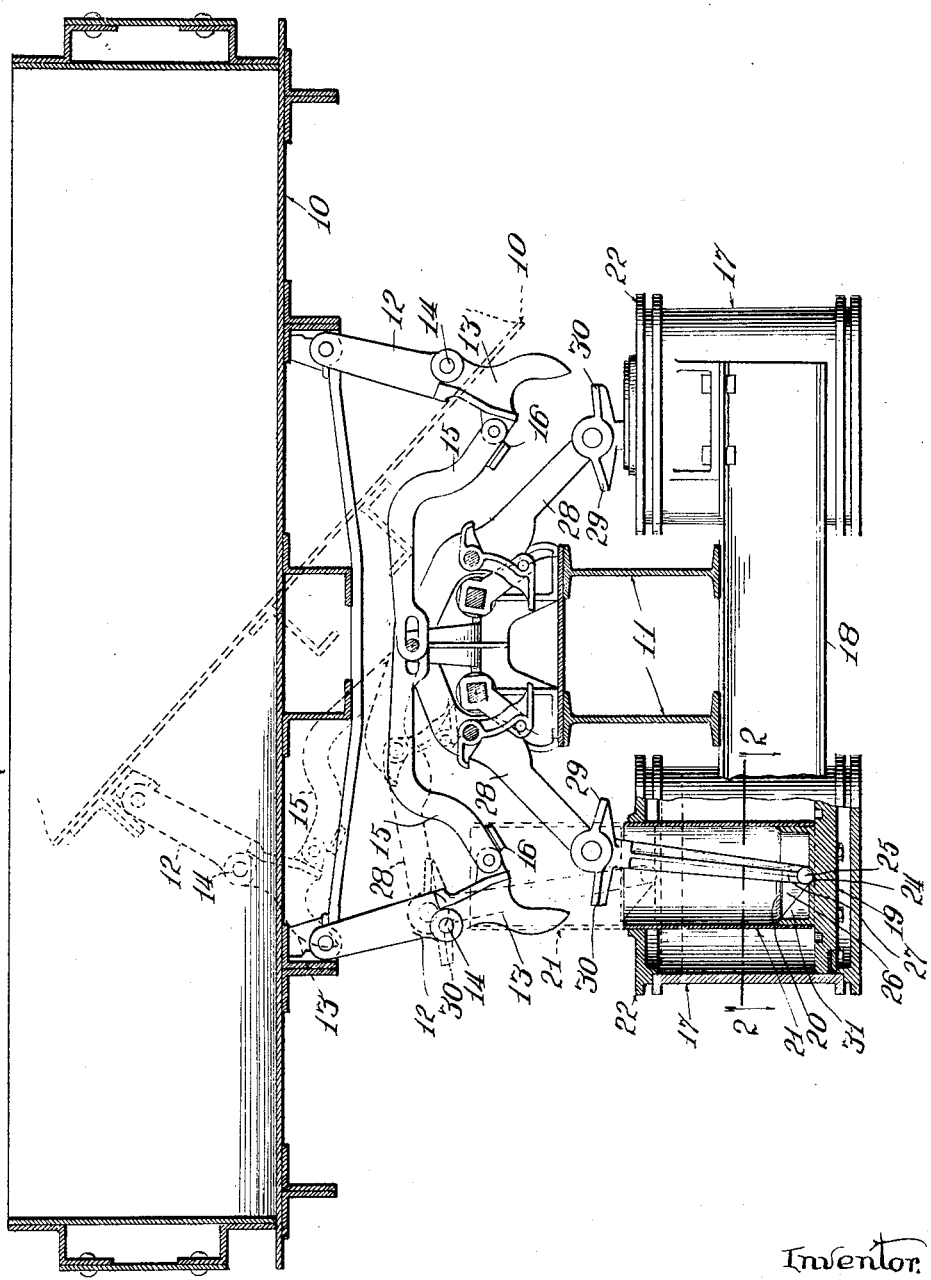

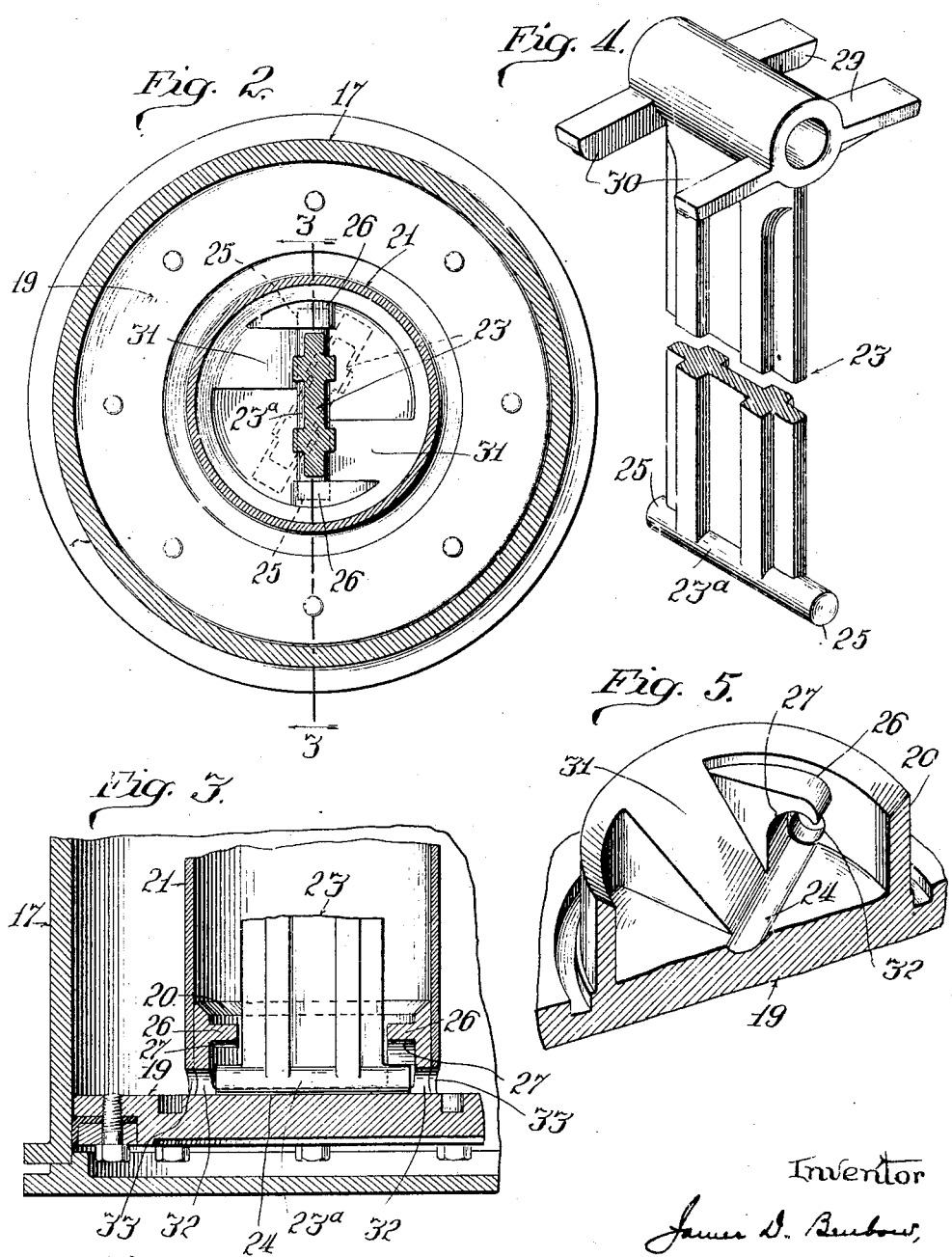

1,678,900

UNITED STATES PATENT OFFICE.

JAMES D. BENBOW, OF AURORA, ILLINOIS, ASSIGNOR TO WESTERN WHEELED SCRAPER COMPANY, OF AURORA, ILLINOIS, A CORPORATION OF ILLINOIS.

FLUID-PRESSURE-OPERATED MECHANISM FOR DUMP CARS.

Original application filed February 7, 1924, Serial No. 691,188. Divided and this application filed January 28, 1926. Serial No. 84,295.

My invention has to do with the cylinder and piston mechanism commonly applied to dump cars for tilting the car bed either to discharge its load or to right it. An example of a dump car of this type is shown and described in Letters Patent No. 1,357,251, dated November 2, 1920, to Jay B. Rhodes, in which the car body is adapted to be tilted laterally in either direction to discharge its load, such tilting of the car body and its return to normal load carrying position being accomplished by means of compressed air operated pistons or plungers operating in cylinders mounted on the under body at opposite sides of the car. In the construction of the Rhodes patent above referred to the plunger is in the form of a cylinder open at its upper end and connected at its lower end with a piston head operating in a vertically disposed compressed air cylinder. Within the plunger is a rocking plunger bar which rests upon the piston head at the lower end of the cylindrical plunger and swings transversely of the car. The upper end of said rocking bar is adapted to operatively engage the car body through the medium of certain interposed lever mechanism, to apply upward thrust to the side margins of the car body to tilt it. While such rocking bar and the interposed lever mechanism are ordinarily constructed so that there is no such connection between them as will prevent the free downward movement of the bar with the piston, when it commences to descend it sometimes happens that owing to slight disarrangement of some part of the lever mechanism, or for some other reasons, the bar will become interlocked with a part of the lever mechanism and fail to move out of engagement with it as the piston descends. As the plunger bar is not positively connected with the piston head, in the instance cited it would fail to descend with the piston and would be likely to be banged against the wall of the plunger cylinder, or violently strike the piston head, when released so that it could descend, causing greater or less damage. The lower end of the plunger bar is intended to be seated on the piston and to rock freely thereon, and the object of my invention is to provide a construction by which this will be accomplished while at the same time the parts will be prevented from separating accidentally and the bar will be forced to travel downward with the piston, thereby freeing it from the lever mechanism interposed between it and the car bed if at any time it should be accidentally held against descent by such lever mechanism. Another object of my invention is to so construct the plunger bar and the piston that said bar can be readily inserted in the cylindrical plunger of the piston, and, notwithstanding the height and narrowness of said plunger, be easily associated with the devices carried by the piston for positioning it thereon and holding it from separating therefrom under the conditions above suggested. These objects I accomplish by the construction and arrangement of parts shown in the drawings and hereinafter described. What I believe to be new is set forth in the claims.

While the improved construction which forms the subject-matter of this application is designed primarily for use in connection with compressed air actuated dump cars, such improvements may also be applied to other uses. It should be understood, therefore, that while I have described my improved construction as applied to a dump car of the type above referred to I have done so merely as a convenient way of disclosing one form in which practical application may be made of such construction, and without intending to limit it to use for that purpose. In a separate application Ser. No. 691,188, filed February 7, 1924, of which this application is a division, I have claimed my improved construction as embodied in a dump car, and therefore such particular subject-matter is not claimed herein.

In the drawings, in which I have shown my invention as applied to a dump car,—

Fig. 1 is a view of the car-body in transverse vertical section, showing in elevation the lever mechanism that is interposed between such car-body and the under body, and also indicating in broken lines the dumping position of the car-body and the positions of the various parts at one side when the car is in such dumping or discharging position,—the cylinder and piston at one side of the car being in section;

Fig. 2 is an enlarged horizontal section taken at line 2—2 of Fig. 1;

Fig. 3 is a vertical section taken at line 3—3 of Fig. 2;

Fig. 4 is a perspective view of the rocking bar that is mounted on the piston, a portion of such bar being broken away; and Fig. 5 is a perspective view of a portion of one of the pistons.

Referring to the drawings,—10 indicates a car-body, which is to be pivotally mounted on the under-frame shown at 11, and interposed between such car-body and under-frame is a lever mechanism through which the tilting of the car-body to either side may be accomplished. Inasmuch as such lever mechanism is old, and is very fully shown and described in patent to Jay B. Rhodes, No. 1,357,251, I do not deem it necessary to here enter into a detailed description of the construction and operation of the same. Such lever mechanism is duplicated at each side of the car, and comprises at each side a toggle lever or thrust bar whose two parts are indicated by 12 and 13 and the joint thereof by 14, the lower member of such toggle lever having pivotally connected with it a link 15 that at its other end is connected with the under-frame and serves to hold the toggle lever normally in position to be engaged by the upper end of a thrust bar carried by the piston. The lower member of the toggle lever is provided with a socket to receive such upper end of the piston, and on the link 15 is provided a block or plate 16 against which a finger on said piston is adapted to bear—all as fully explained in said Rhodes patent.

Beneath the car-body and suitably secured to the under-frame, as by cross-beams 18, are two cylinders 17, each of which is adapted to be supplied with compressed air in the usual way, either for dumping or righting purposes. Inasmuch as the two cylinders and the parts contained therein are exactly alike, a description of one will suffice. 19 indicates a piston of the plunger type that movably fits within the cylinder and, in the construction shown, an annular wall 20 rises for a short distance from the central portion of the upper face of the piston, and to that wall is secured a cylindrical member 21 that constitutes a hollow stem for the piston, such stem, in the construction shown, rising through and slightly above the upper head 22 of the cylinder. 23 indicates a plunger bar or connecting rod member, which is provided at its lower end with a round or cylindrical portion 23ª that serves as a rocker bearing surface for said bar. Such cylindrical portion is normally seated in a correspondingly shaped groove 24 that extends centrally across the upper face of the piston 19. As clearly shown in Fig. 4, the cylindrical portion 23ª of the bar 23 extends outwardly beyond the opposite edges of said bar, forming two projections 25 which also fit in the groove 24. 26 indicates two similarly disposed heavy ears that project from the face and annular wall 20 of the piston, at diametrically opposite points, and are preferably formed integral therewith. These ears are spaced apart a sufficient distance to receive between them the body of the bar 23, and the outer edge of each ear is notched as at 27 (see Fig. 5) so as to form hooks that project in opposite directions over the groove 24 in the face of the piston 19 and high enough above such face to permit of the application of the bar 23 thereto as hereinafter described. As best shown in Fig. 2, these ears are respectively located at opposite sides of the groove 24, and hence to insert the bar 23 in place so that its curved lower edge will be seated in the groove such bar must, when it is inserted into the hollow stem 21, be at an angle to the groove so that the projections 25 can pass the overlying ends of the ears. When inserted in that manner, and the lower edge of the bar is brought to rest upon the surface of the piston, the bar can then be turned axially, which will bring the projections 25 under the overhanging parts or hooks of the ears, and of course allow the rounded lower end of the bar to settle into the groove in the piston. Thereafter, as will be understood, with the bar secured at its upper end in a manner to prevent any axial turning, any relative vertical movement between the piston and the bar that would tend to draw the piston out of its groove would cause the projections 25 to engage with the hook portions of the ears. Said hooks therefore serve to hold the bar in operative relation to the piston without interfering with its rocking. With the plunger bar in place, as above described, the groove 24 forms seating surfaces for the lower or outer sides of the projections 25, and the notches 27 form seating surfaces for the upper or outer sides of said projections, said pairs of seating surfaces being spaced apart sufficiently, longitudinally of the piston, to permit of the aforesaid connection and disconnection of the plunger bar by the mere relative rotation between the plunger bar and piston, corresponding somewhat to a bayonet joint connection. Accidental disconnection of the parts is prevented because the bar is held against axial movement by reason of its being pivoted to the lower end of a swinging arm 28, the inner end of which is pivoted along the center line of the car, as described in said Rhodes patent. With the bar 23 are formed fingers 30 that project laterally from the upper end thereof and are adapted to engage the notched lower edge of the toggle member 13, and also formed with it are other fingers 29 that project in the opposite direction from the fingers 30 and are adapted to engage with the block or plate 16 on the link 15—all as described in said patent.

At 31 are shown heavy diagonal blocks formed with the piston 19 and its wall portion 20, such blocks being located, as are the ears 26, at opposite sides of the groove 24, and lying, in the construction shown, alongside of said ears. Such inclined blocks serve not only as reinforcing or strengthening members, but also as guiding devices for the bar 23 in its limited vertical movement relatively to the piston permitted by the ears 26, and as stops to aline said bar with the groove 24 when applying it to the piston. At 32 are shown holes extending through the wall portion 20 of the piston, which holes register with other holes 33 in the lower end of the hollow stem 21, such holes being provided merely to allow of the escape of any water that may get into the said stem.

When compressed air is admitted to the cylinder for the purpose of forcing upward the piston and the bar that is rockingly mounted thereon, such bar will of course be directed into proper engagement with the lower member 13 of the toggle, and thereby cause either a tilting of the car-body or a righting thereof if such body has theretofore been tilted so as to dump at that side at which is located the moving piston, as fully explained in said Rhodes patent. While ordinarily there will be no such engagement of the piston with the lever mechanism as would prevent the prompt moving down of the rocking bar 23 with its piston, yet under certain circumstances it sometimes happens that there is such a locking of the parts together as to hold the bar 23 up while its piston descends, and in such case such a violent sidewise movement of the lower end of the bar ensues as is apt to be destructive of the piston parts. However, by the provision of the hook-shaped ears that overlie the projections 25 on the bar, it is evident that if any such entangling of the bar with the lever mechanism takes place, the hooks of the ears will be brought into contact with the said projections soon after the piston starts downward, and thus will exert a powerful pull on the bar that will release it from any such undesired engagement with the lever mechanism, and maintain the bar in operative relation to the piston.

What I claim as my invention and desire to secure by Letters Patent, is—

1. The combination with a cylinder and piston, of a plunger bar having a bearing surface at its lower end seated on the piston, and oppositely disposed hooks carried by the piston adapted to engage opposite side portions of the bar to hold said bar in operative relation to the piston.

2. The combination with a cylinder and piston, of a plunger bar, and means operating to hold said bar in operative relation to the piston comprising connecting devices pivotally engaging each other and movable into or out of operative relation to each other by turning of said bar about its longitudinal axis with respect to the piston.

3. The combination with a cylinder and piston, of a plunger bar, and means operating to hold said bar in operative relation to the piston comprising oppositely disposed hooks carried by the piston, and projections carried by said bar and adapted to be moved into engagement with said hooks by turning said bar about its longitudinal axis with respect to the piston.

4. The combination with a cylinder and a piston operating therein, said piston having a transverse groove in its upper surface, of a plunger bar having an integral rocker bearing surface at its lower end adapted to bear in said groove, and means integral with the piston for holding said bar and piston in operative relation to each other.

5. The combination with a cylinder and a piston operating therein, said piston having a transverse groove in its upper surface, of a plunger bar having a bearing surface at its lower end adapted to bear in said groove, and devices cooperating to connect or disconnect said bar and piston by axial movement of said bar with respect to the piston.

6. The combination with a cylinder and a piston operating therein, said piston having a transverse groove in its upper surface, of a plunger bar having a bearing surface at its lower end adapted to bear in said groove, and devices cooperating to connect or disconnect said bar and piston by axial movement of said bar with respect to the piston comprising hooks carried by the piston and projections carried by the bar adapted to be engaged by said hooks.

7. The combination of a piston, a plunger rod, and a rockable bayonet joint connection between said piston and plunger rod, permitting instantaneous connection and disconnection of said rod and said piston by the mere partial rotation and endwise movement of said rod relative to said piston.

8. The combination of a piston member and a plunger member having a rocking connection therewith, said rocking connection comprising two diametrically opposite projections on one of said members, and longitudinally spaced pairs of seating surfaces on the other of said members adapted to engage with the outer and inner sides of each of said projections, the seating surfaces of both pairs being spaced sufficiently to permit said projections to be rotated out from between said surfaces to permit the ready disconnection of said members.

9. The combination of a piston, and a plunger having rocking connection therewith, said rocking connection comprising two diametrically opposite projections on said plunger, and longitudinally spaced pairs of seating surfaces formed integral with the piston and adapted to engage with the upper and lower sides of each of said projections, the seating surfaces of one pair being spaced sufficiently from the seating surfaces of the other pair to permit said projections to be rotated out from between said surfaces to permit the ready disconnection of said piston and plunger member.

JAMES D. BENBOW.